(12) United States Patent
Lin

(10) Patent No.: US 10,124,567 B2
(45) Date of Patent: Nov. 13, 2018

(54) FILTER CARTRIDGE AND MANUFACTURING METHOD THEREOF

(71) Applicant: PRO-PURE INC., New Taipei (TW)

(72) Inventor: Hsiang-Chi Lin, New Taipei (TW)

(73) Assignee: PRO-PURE INC., New Taipei (TW)

( * ) Notice: Subject to any disclaimer, the term of this patent is extended or adjusted under 35 U.S.C. 154(b) by 426 days.

(21) Appl. No.: 14/720,920

(22) Filed: May 25, 2015

(65) Prior Publication Data

US 2016/0296861 A1    Oct. 13, 2016

(30) Foreign Application Priority Data

Apr. 9, 2015   (TW) .............................. 104111505 A

(51) Int. Cl.
   *B01D 29/00*    (2006.01)
   *B32B 37/00*    (2006.01)
   (Continued)

(52) U.S. Cl.
   CPC ........ *B32B 37/0084* (2013.01); *B01D 46/527* (2013.01); *B01D 27/005* (2013.01);
   (Continued)

(58) Field of Classification Search
   CPC . B32B 37/0084; B32B 37/0053; B32B 37/08; B32B 37/1284; B32B 37/20;
   (Continued)

(56) References Cited

U.S. PATENT DOCUMENTS 2,917,421 A * 12/1959 Miller .................... D04H 11/08
                                                        428/172
3,025,963 A *  3/1962 Bauer .................. B01D 27/005
                                                        156/205
(Continued)

FOREIGN PATENT DOCUMENTS

CN         202061499 U     12/2011
CN         203043736 U      7/2013
(Continued)

OTHER PUBLICATIONS

English Language Abstract of DE20310495.
(Continued)

*Primary Examiner* — Dung H Bui
(74) *Attorney, Agent, or Firm* — Hershkovitz & Associates, PLLC; Abe Hershkovitz

(57) ABSTRACT

A filter cartridge and a manufacturing method thereof, the manufacturing method has the following steps: adhering a wavy filtering sheet and a flat filtering sheet, pressing the filtering sheets, rolling the filtering sheets, and mounting a filter frame. A part of peaks of the wavy filtering sheet are pressed to lean toward a same direction, which has the following advantages. First, in a channel, an outlet opening is larger than an inlet opening in sectional area, thereby reducing the impedance. Second, a first end sealing adhesive layer is pressed to make said layer tightly connected to the filtering sheets, thereby making the seal reliable. Third, the pressed peaks lean toward a same direction, such that there are gaps large enough disposed between any two peaks in arching portions of the innermost circles of the filter core in the outlet side, which ensures the channels are unobstructed.

9 Claims, 18 Drawing Sheets

(51) Int. Cl.
*B01D 46/52* (2006.01)
*B01D 27/00* (2006.01)
*B01D 29/11* (2006.01)
*B01D 29/23* (2006.01)
*B01D 46/00* (2006.01)
*B01D 46/24* (2006.01)
*B32B 37/08* (2006.01)
*B32B 37/12* (2006.01)
*B32B 37/20* (2006.01)

(52) U.S. Cl.
CPC .......... *B01D 29/111* (2013.01); *B01D 29/237* (2013.01); *B01D 46/0001* (2013.01); *B01D 46/2411* (2013.01); *B01D 2275/50* (2013.01); *B32B 37/0053* (2013.01); *B32B 37/08* (2013.01); *B32B 37/1284* (2013.01); *B32B 37/20* (2013.01); *B32B 2432/00* (2013.01)

(58) Field of Classification Search
CPC .............. B32B 2432/00; B01D 46/527; B01D 2275/50; B01D 2432/00; B01D 46/0001–46/2411; B01D 27/005; B01D 27/006; B01D 29/111; B01D 29/237
See application file for complete search history.

(56) References Cited

U.S. PATENT DOCUMENTS

| | | | | |
|---|---|---|---|---|
| 3,676,242 A * | 7/1972 | Prentice | ................ | B32B 274/00 156/167 |
| 3,853,529 A * | 12/1974 | Boothe | .............. | B01D 46/0001 55/499 |
| 5,254,194 A * | 10/1993 | Ott | ..................... | A44B 18/0011 156/176 |
| 5,362,346 A * | 11/1994 | Bullock, Sr. | ........ | B32B 37/1284 118/249 |
| 5,616,394 A * | 4/1997 | Gorman | .................... | B32B 3/06 24/442 |
| 5,618,324 A | 4/1997 | Sommer et al. | | |
| 5,902,364 A * | 5/1999 | Tokar | ................... | B01D 25/001 55/498 |
| 6,235,195 B1 * | 5/2001 | Tokar | ................... | B01D 25/001 210/238 |
| 7,261,756 B2 * | 8/2007 | Merritt | ............... | B01D 46/0002 55/482 |
| 7,896,999 B2 * | 3/2011 | Marschke | ............. | B31D 3/007 156/207 |
| 8,042,694 B2 | 10/2011 | Driml et al. | | |
| 9,669,341 B2 * | 6/2017 | Majer | ................. | B01D 46/0005 |
| 2002/0170856 A1 * | 11/2002 | Jaroszczyk | ........... | B01D 29/111 210/493.5 |
| 2003/0121845 A1 * | 7/2003 | Wagner | ................ | B01D 25/001 210/493.1 |
| 2004/0118771 A1 * | 6/2004 | Schukar | ............... | B01D 29/012 210/493.4 |
| 2005/0252182 A1 * | 11/2005 | Golden | .............. | B01D 39/1623 55/521 |
| 2006/0005517 A1 | 1/2006 | Sundet et al. | | |
| 2006/0091061 A1 * | 5/2006 | Brown | ................. | B01D 46/527 210/440 |
| 2006/0123754 A1 | 6/2006 | Oelpke et al. | | |
| 2006/0151655 A1 * | 7/2006 | Johnston | .............. | B01D 25/001 242/410 |
| 2006/0163150 A1 * | 7/2006 | Golden | ................ | B01D 25/001 210/493.1 |
| 2007/0186528 A1 * | 8/2007 | Wydeven | ........... | B01D 46/0005 55/498 |
| 2008/0011896 A1 * | 1/2008 | Johnston | .............. | B01D 25/001 242/410 |
| 2008/0086990 A1 * | 4/2008 | Kuempel | ........... | B01D 46/2411 55/357 |
| 2011/0183121 A1 * | 7/2011 | Van Berlo | ............. | B31F 1/2818 428/182 |
| 2011/0197556 A1 * | 8/2011 | Brown | ................. | B01D 46/527 55/498 |
| 2014/0196422 A1 * | 7/2014 | Lin | ........................ | B01D 67/00 55/498 |
| 2014/0373494 A1 * | 12/2014 | Lepine | ............... | B01D 46/2414 55/502 |
| 2016/0151732 A1 * | 6/2016 | Lin | ...................... | B01D 46/527 55/485 |

FOREIGN PATENT DOCUMENTS

| | | |
|---|---|---|
| DE | 20310495 | 12/2003 |
| GB | 1173500 | 12/1969 |
| JP | S5892435 A | 6/1983 |
| JP | 1988122617 U | 8/1988 |
| JP | 1989163410 U | 11/1989 |
| JP | 1996504361 A | 5/1996 |
| JP | 2013208611 A | 10/2013 |
| TW | I280150 | 5/2007 |
| TW | 201427762 A | 7/2014 |
| TW | M490509 | 11/2014 |

OTHER PUBLICATIONS

English Language Abstract of JP1988122617U.
English Language Abstract of JP1989163410U.
English Language Abstract of JP2013208611A.
English Language Abstract of JP1996504361A.
English Language Abstract of TW201427762A.
English Language Abstract of TWI280150.
English Language Abstract of TWM490509.
English Language Abstract of JPS5892435A.
English Language Abstract of CN202061499U.
English Language Abstract of CN203043736U.

* cited by examiner

FILTER CARTRIDGE AND MANUFACTURING METHOD THEREOF

CROSS-REFERENCE TO RELATED APPLICATIONS

This application is based upon and claims priority under 35 U.S.C. 119 from Taiwan Patent Application No. 104111505 filed on Apr. 9, 2015, which is hereby specifically incorporated herein by this reference thereto.

BACKGROUND OF THE INVENTION

1. Field of the Invention

The present invention relates to a filter cartridge and a manufacturing method thereof, and in particular to a filter cartridge for filtering suspended particles from fluid.

2. Description of the Prior Arts

A conventional filter device comprises a housing and a filter cartridge. The housing has an inlet and an outlet. The filter cartridge is mounted in the housing, and has a filter core and a filter frame. The filter frame has a first frame, a second frame and a foam. The frames are both annular, and are respectively mounted on both axial end surfaces of the filter core. The foam is mounted on the first frame and abuts an inner surface of the housing to seal a gap between the filter core and the housing. Thus, when fluid to be filtered enters the housing from the inlet, the fluid must pass through the filter core and is filtered, and then the fluid can leave the housing from the outlet.

The foam is soft such that the foam can effectively seal the gap. However, the shortcoming of the filter frame is that the foam cannot bear too much differential pressure because of being too soft.

In addition, the conventional filter cartridge has a wavy filtering sheet and a flat filtering sheet. The filtering sheets are rolled into shape of a cylinder and are alternately stacked to form multiple axial channels. Each of half of the channels is coated with an end sealing adhesive layer at an axial end adjacent to the inlet of the housing to seal said channel. Each of the other half of the channels is coated with an end sealing adhesive layer at an axial end adjacent to the outlet of the housing to seal said channel. Therefore, the fluid to be filtered enters the half channels, flows along said channels, hits the end sealing adhesive layer adjacent to the outlet, and thus passes through the wavy filtering sheet and the flat filtering sheet to the other half channels, such that the fluid can leave the filter core. The fluid is filtered when passing through the wavy and the flat filtering sheets.

However, the filter cartridge has the following shortcomings:

First, a sectional area is constant everywhere in each channel. That is, a sectional area of an inlet opening of the channel is the same as a sectional area of an outlet opening of the channel, such that impedance cannot be reduced.

Second, adherence between the end sealing adhesive layers and the filtering sheets may not be tight enough, and thus gaps may be formed. Therefore, the fluid may pass through the gaps rather than the filtering sheets when hitting the end sealing adhesive layer, such that the fluid is unfiltered.

Third, with reference to FIG. 19, an oblique angle of the wave of the wavy filtering sheet 91 is about 60 degrees, which makes the filter core almost sealed between any two peaks in arching portions of the innermost circles when the wavy filtering sheet 91 and the flat filtering sheet 92 are rolled. Therefore, the fluid cannot pass through said arching portions.

Fourth, the wavy filtering sheet is coated transversely with multiple connecting adhesive layers to be adhered with the flat filtering sheet. Conventionally, a gluing gun coats elongated adhesives continuously and transversely across all the peaks and troughs of the wavy filtering sheet to form the connecting adhesive layers. Then, the filtering sheets are adhered with each other by the connecting adhesive layers. However, with said way of coating adhesive, only the parts on the peaks of the connecting adhesive layers can be adhered to the flat filtering sheet. Most of the connecting adhesive layers are left unadhered in the channels between the filtering sheets, and interfere with the flow of the fluid.

Fifth, when the filtering sheets are adhered together but not rolled yet, the filtering sheets are cut on and along the end sealing adhesive layer adjacent to the inlet such that the edges of said end sealing adhesive layer and the filtering sheets are aligned with each other. However, it is hard to cut the solidified end sealing adhesive layer.

Sixth, because the end sealing adhesive layer, either the one adjacent to the inlet or the one adjacent to the outlet, is not solidified soon after coating, the end sealing adhesive layer may flow toward two sides axially due to the gravity. But the part of the end sealing adhesive layer that flows axially inward reduces a distance between the end sealing adhesive layers, thereby reducing a filtering area.

To overcome the shortcomings, the present invention provides a filter cartridge and a manufacturing method thereof to mitigate or obviate the aforementioned problems.

SUMMARY OF THE INVENTION

The main objective of the present invention is to provide a filter cartridge and a manufacturing method thereof that can reduce the impedance of the filter cartridge.

The manufacturing method of the filter cartridge has the following steps: adhering a wavy filtering sheet and a flat filtering sheet, pressing the filtering sheets, rolling the filtering sheets, and mounting a filter frame. A part of peaks, which are adjacent to an outlet side, of the wavy filtering sheet are pressed to lean toward a same direction, which has the following advantages. First, in a channel, a sectional area of an outlet opening is larger than a sectional area of an inlet opening, thereby reducing the impedance. Second, a first end sealing adhesive layer is also pressed to make said layer tightly connected to the filtering sheets, thereby further making the seal reliable. Third, the pressed peaks lean toward a same direction, such that there are gaps large enough disposed between any two peaks in arching portions of the innermost circles of the filter core in the outlet side, which ensures the channels are unobstructed.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
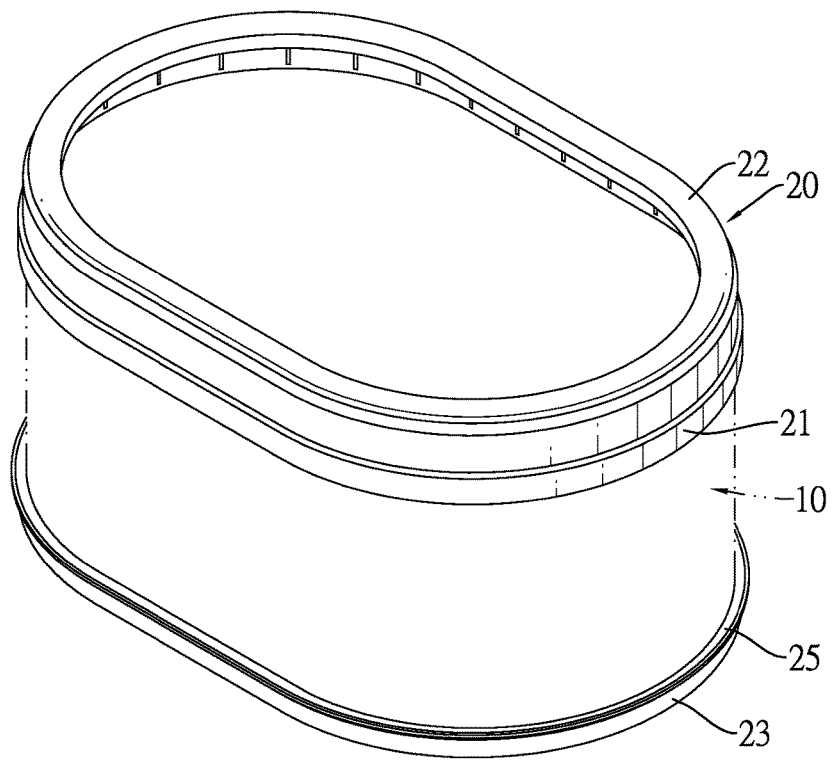
FIG. 1 is a perspective view of a filter cartridge in accordance with the present invention.

With reference to FIG. 1, a filter cartridge in accordance with the present invention comprises a filter core 10 and a filter frame 20.

Figure 2:
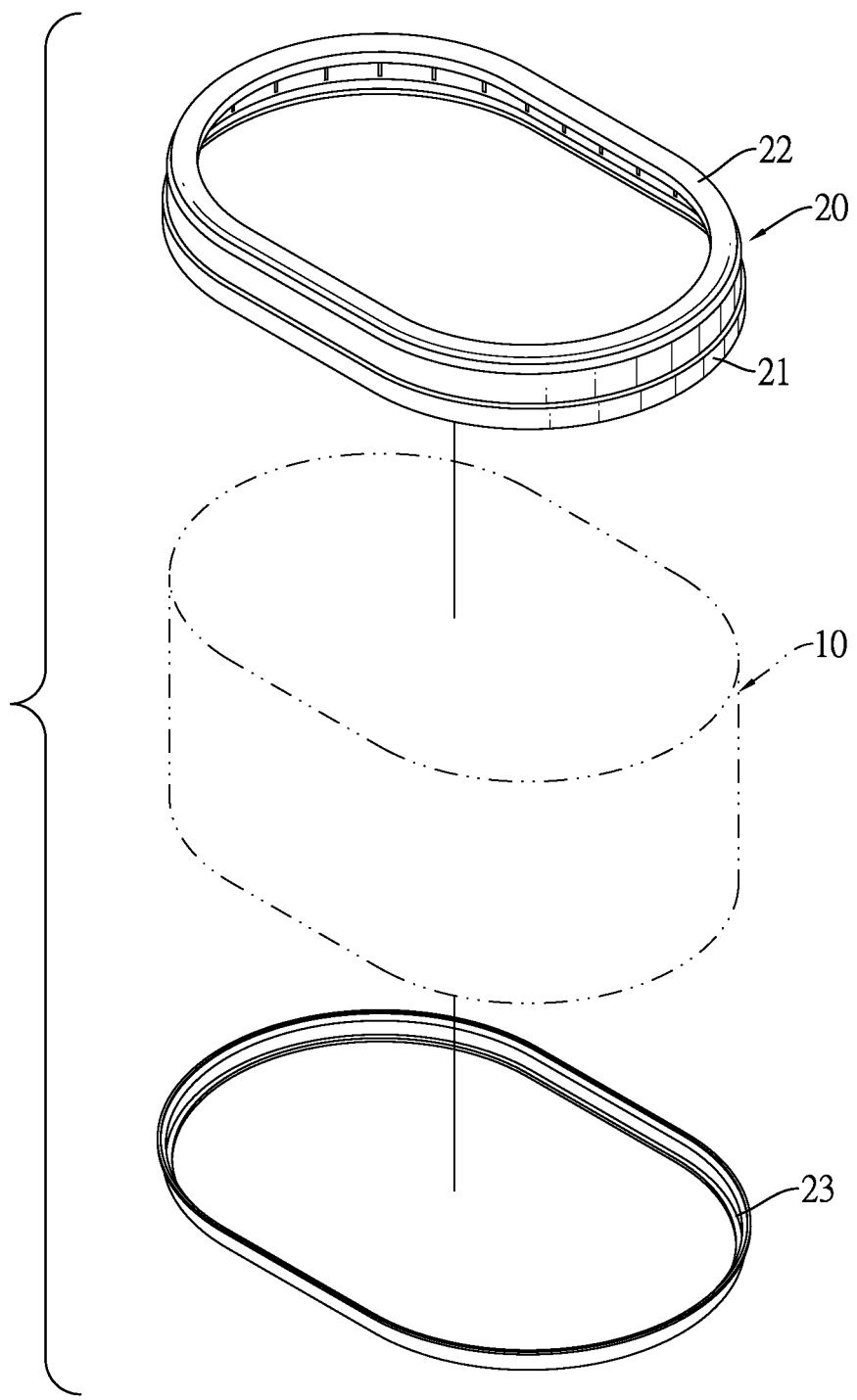
FIG. 2 is an exploded perspective view of the filter cartridge in FIG. 1.
Figure 7:
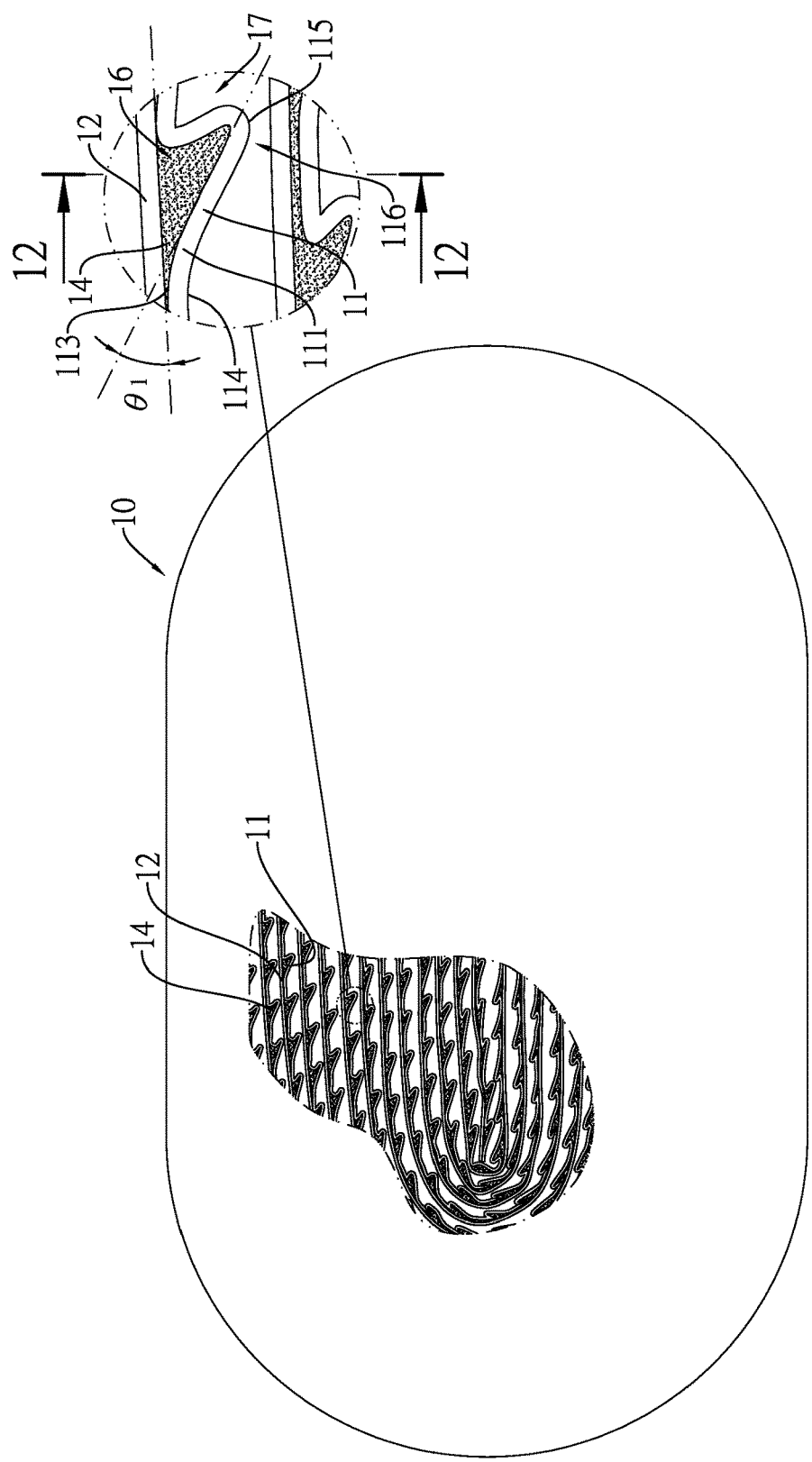
FIG. 7 is an end view of an outlet side of a filter core of the filter cartridge in FIG. 1.
Figure 8:
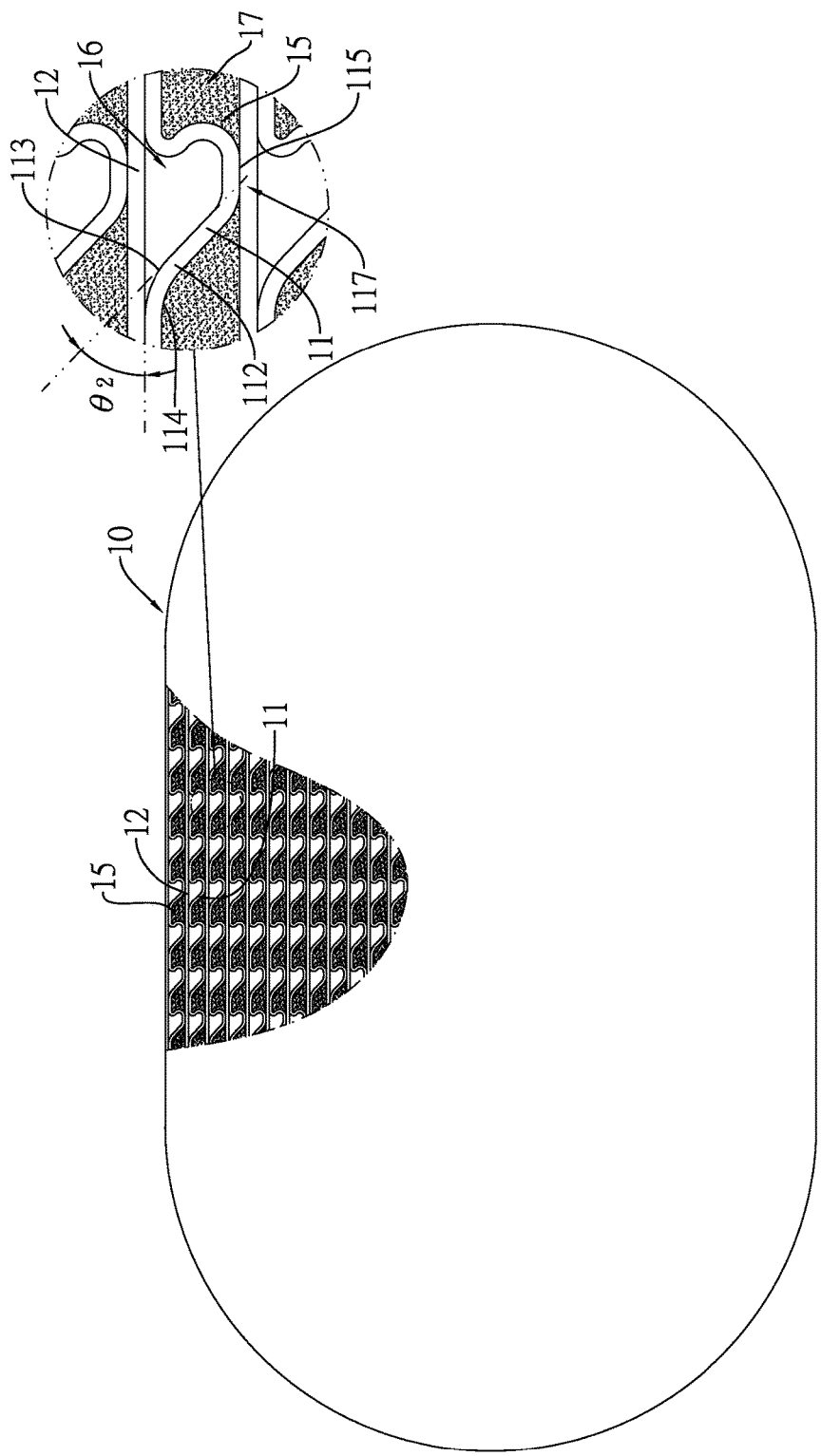
FIG. 8 is an end view of an inlet side of the filter core of the filter cartridge in FIG. 1.
Figure 11:
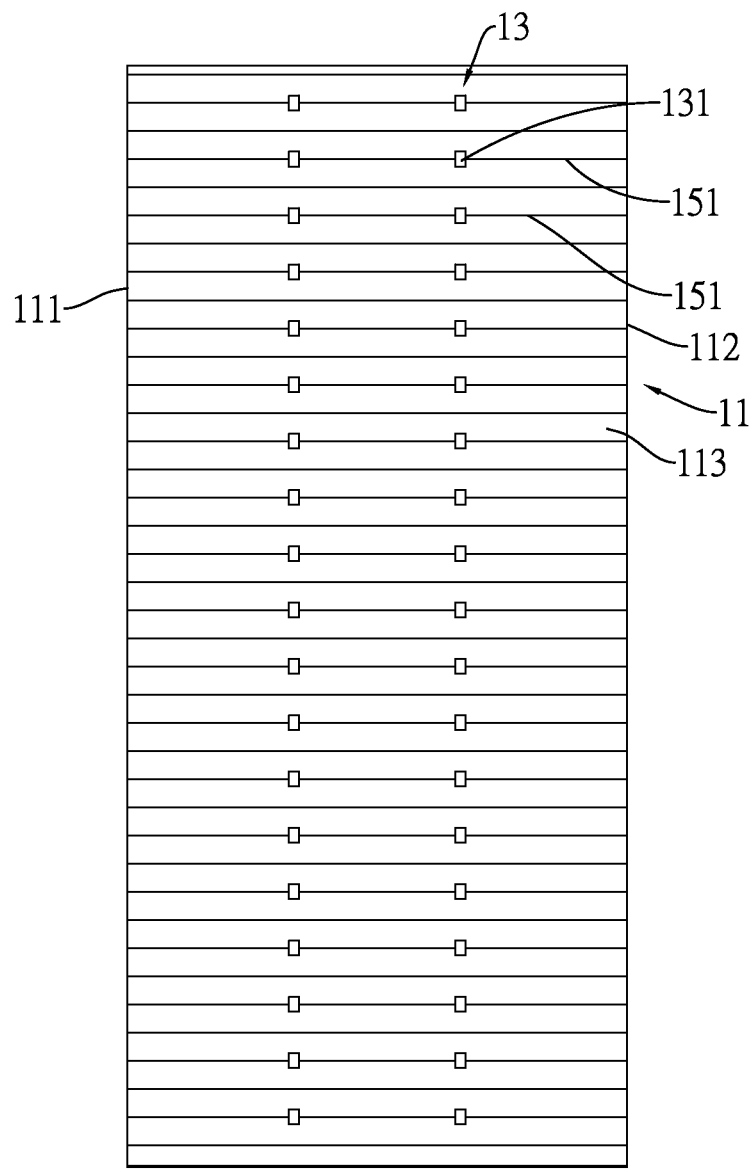
FIG. 11 is a top view of a first surface of the filter cartridge in FIG. 1, showing the wavy filtering sheet is coated with a connecting adhesive layer.
Figure 12:
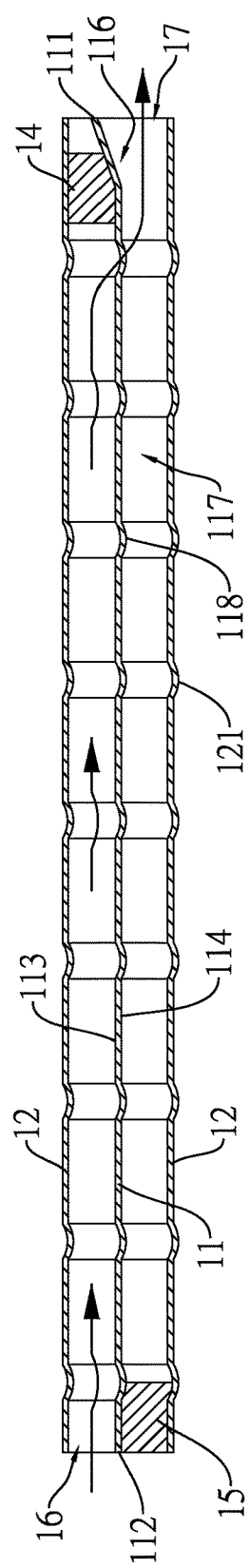
FIG. 12 is a side view in partial section of the wavy filtering sheet of the filter cartridge in FIG. 1.
Figure 16:
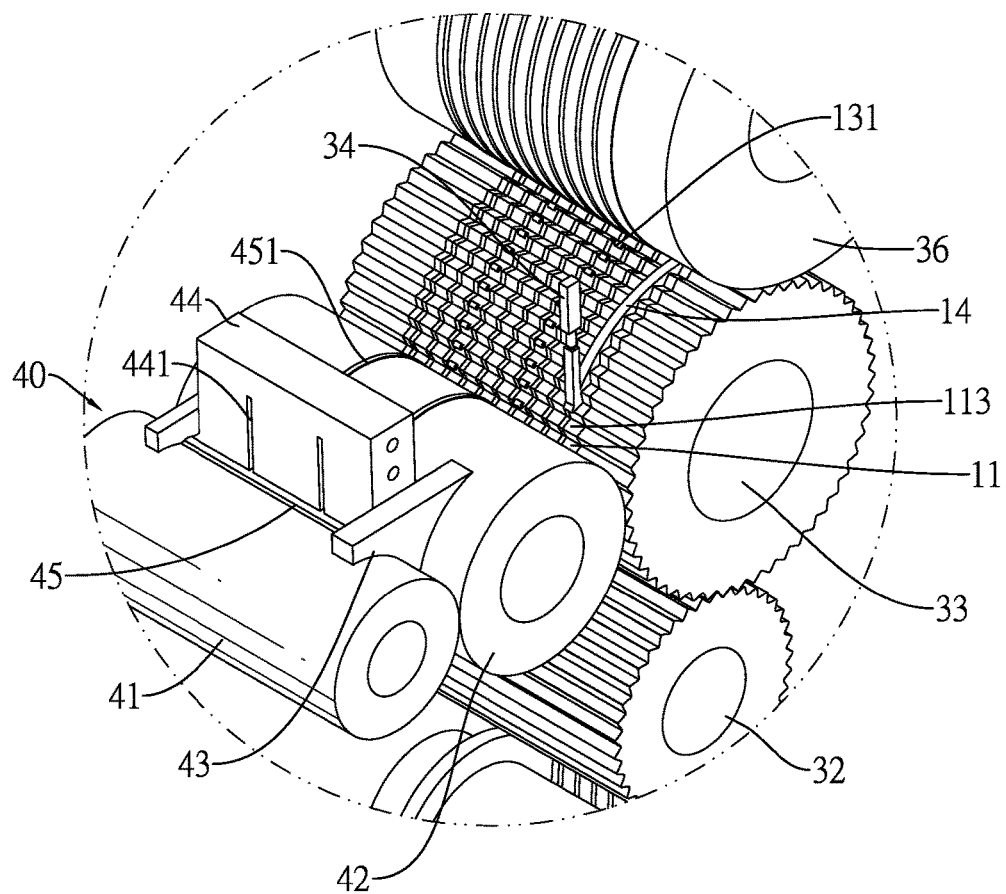
FIG. 16 is a perspective view of a gluing device of the manufacturing method of the filter cartridge in FIG. 13.
Figure 17:
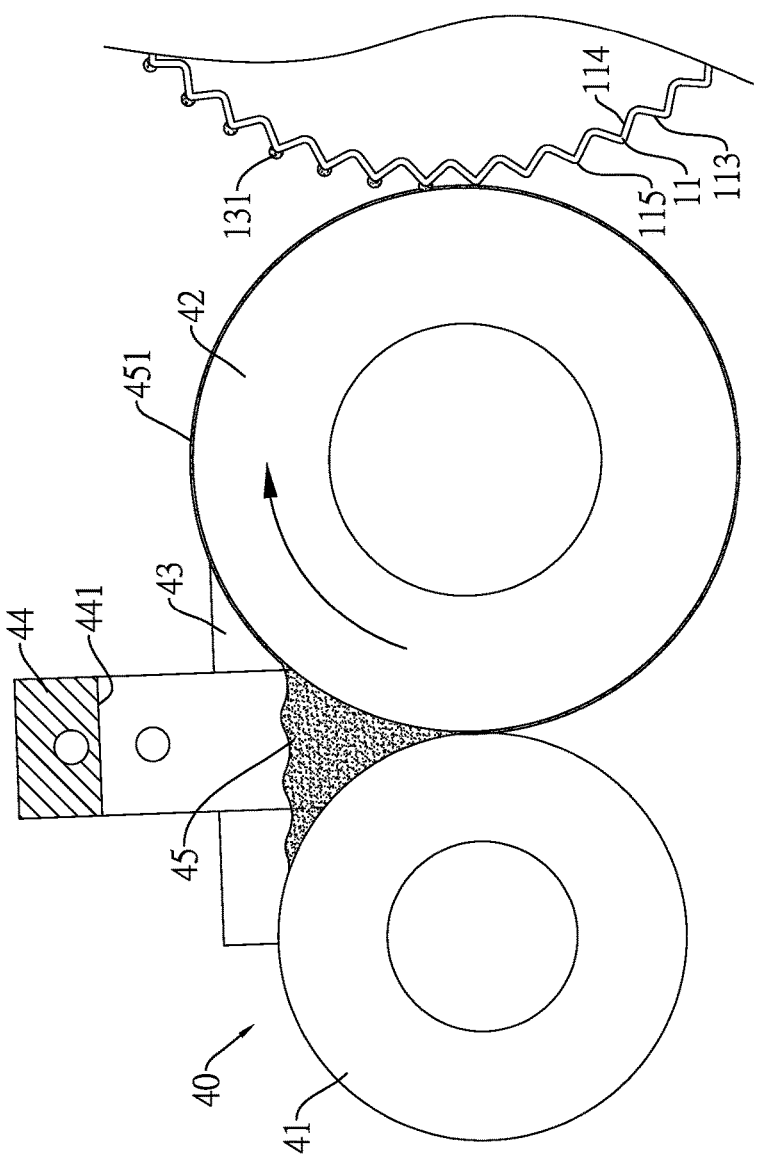
FIG. 17 is a side view of the gluing device of the manufacturing method of the filter cartridge in FIG. 13.
Figure 18:
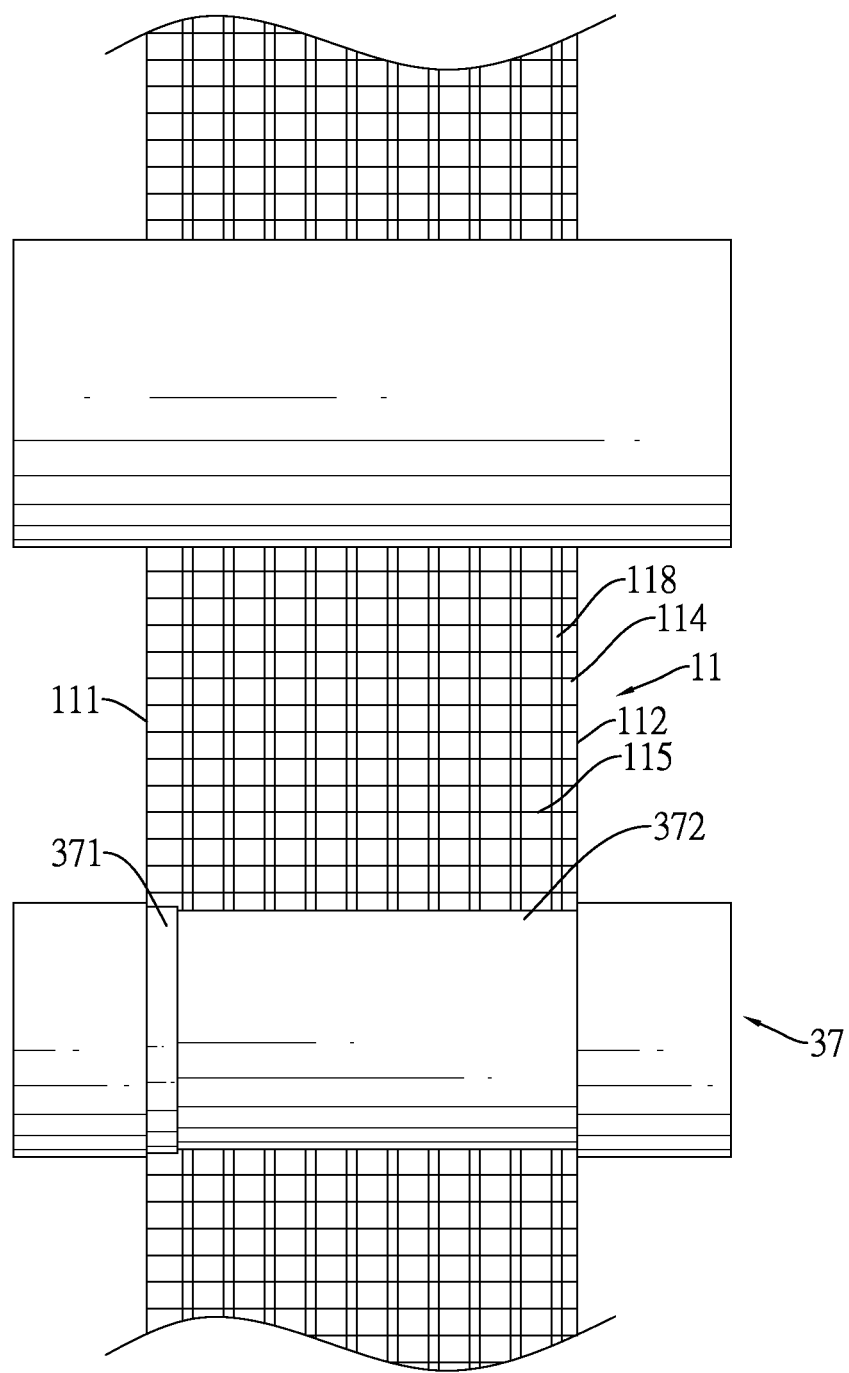
FIG. 18 is a bottom view of a second pressing roller of the manufacturing method of the filter cartridge in FIG. 13.
Figure 19:
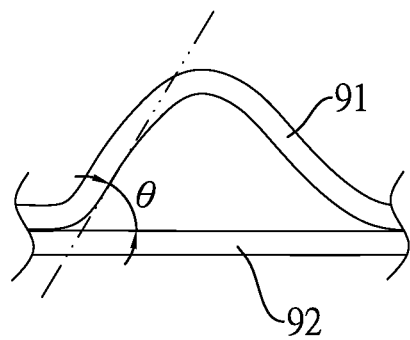
FIG. 19 is an operational view of a conventional wavy filtering sheet in accordance with the prior art, showing an oblique angle of the wave.

With reference to FIGS. 2, 7 and 8, the filter core 10 has a wavy filtering sheet 11, a flat filtering sheet 12, a connecting adhesive layer 13, a first end sealing adhesive layer 14, and a second end sealing adhesive layer 15. The wavy filtering sheet 11 and the flat filtering sheet 12 are for filtering suspended pollutants. The wavy filtering sheet 11 has multiple peaks 115, an outlet side 111, an inlet side 112, a first surface 113 and a second surface 114. The outlet side 111 and the inlet side 112 are disposed opposite to each other, are parallel with each other, and are perpendicular to the peaks 115 in extending direction. The first surface 113 and the second surface 114 are disposed opposite to each other. The connecting adhesive layer 13 and the first end sealing adhesive layer 14 are coated on the first surface 113. The first end sealing adhesive layer 14 is spread along the outlet side 111, and is arranged apart from the outlet side 111. With reference to FIGS. 11 and 16, the connecting adhesive layer 13 has multiple connecting adhesive dots 131 coated on the peaks 115 of the first surface 113 of the wavy filtering sheet 11, and are arranged apart from each other. That is, there is no adhesive in any trough between any two connecting adhesive dots 131 that are respectively on two adjacent peaks 115, and the multiple connecting adhesive dots 131 on the same peak 115 are not connected to each other. In a preferred embodiment, the connecting adhesive dots 131 are arranged in two separated straight lines, which are parallel with the outlet side 111 and the inlet side 112. That is, there are two connecting adhesive dots 131 on each peak 115. With reference to FIGS. 8 and 12, the second end sealing adhesive layer 15 is coated on the second surface 114, and is spread along the inlet side 112. An axial outer surface of the second end sealing adhesive layer 15 and the inlet side 112 are aligned with each other.

Figure 9:
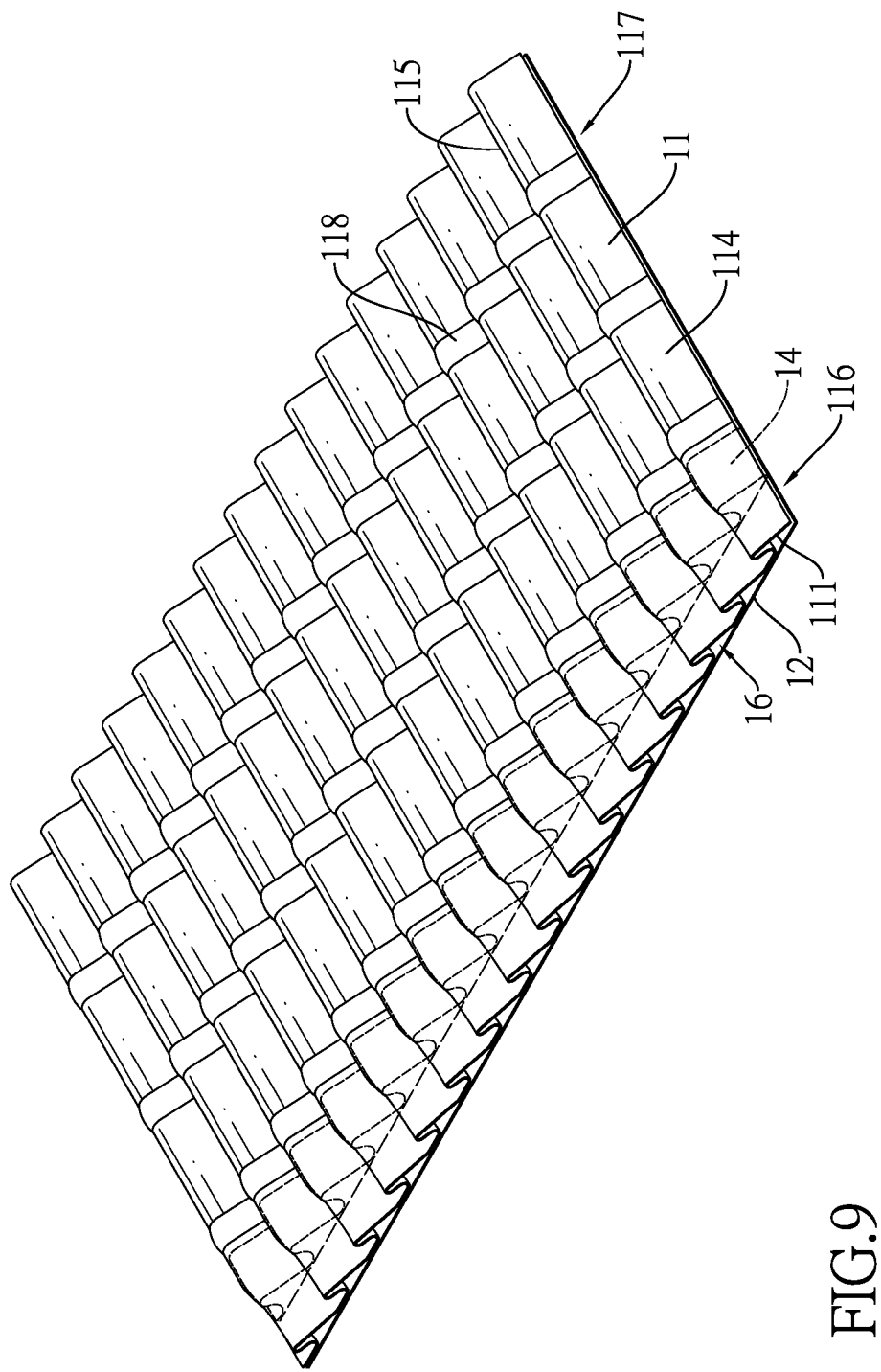
FIG. 9 is a partially enlarged view of the filter cartridge in FIG. 1, showing filtering sheets are adhered and pressed.

With reference to FIGS. 7 to 9, the flat filtering sheet 12 is adhered with the first surface 113 of the wavy filtering sheet 11 by the connecting adhesive layer 13 and the first end sealing adhesive layer 14. The filtering sheets 11, 12 are rolled and alternately stacked to be adhered with each other by the second end sealing adhesive layer 15.

With reference to FIGS. 7, 8 and 12, multiple first channels 16 and multiple second channels 17 are formed between the rolled filtering sheets 11, 12, and extend axially. The first end sealing adhesive layer 14 is disposed in the first channels 16, and the second end sealing adhesive layer 15 is disposed in the second channels 17. The first channels 16 are disposed radially outward relative to the second channels 17.

Figure 10:
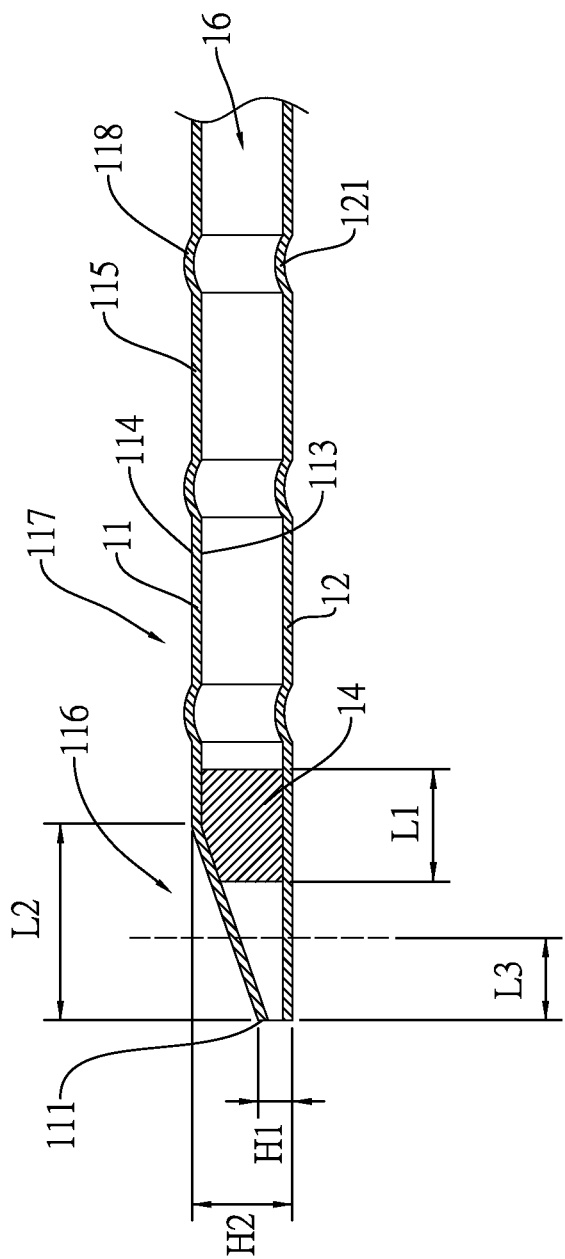
FIG. 10 is a side view in partial section of the filter cartridge in FIG. 1, showing the filtering sheets are adhered and pressed.

With reference to FIGS. 9, 10 and 12, the wavy filtering sheet 11 further has a first pressing region 116 and a second pressing region 117 formed on the second surface 114. The first pressing region 116 extends along the outlet side 111, and extends from the outlet side 111 to a part of the first end sealing adhesive layer 14. The second pressing region 117 is formed on the second surface 114 at a remaining area other than the first pressing region 116. The peaks 115 in the first and the second pressing regions 116, 117 are pressed to lean clockwise or counterclockwise together. The peaks 115 in the first pressing region 116 are shorter than the peaks 115 in the second pressing region 117 in height. Thus, the peaks 115 in the first pressing region 116 are not adhered to and do not contact the flat filtering sheet 12 adjacent to a second surface 114.

The wavy filtering sheet 11 has multiple corrugations 118 formed on the wavy filtering sheet 11, axially arranged apart from each other, and being perpendicular to the peaks 115 in extending direction. The flat filtering sheet 12 has multiple corrugations 121 formed on the flat filtering sheet 12 and axially arranged apart from each other. The corrugations 118, 121 of the wavy and the flat filtering sheets 11, 12 correspond to each other in amount, shape and position.

In a preferred embodiment, an axial sectional area of the filter core 10 is, but not limited to, racetrack-shaped. The axial sectional area of the filter core 10 also can be circular or in any other shape. In a preferred embodiment, the filter core 10 has no jig mounted through a center of the filter core 10, but the filter core 10 also can be installed with a tube or a jig through the center.

Figure 3:
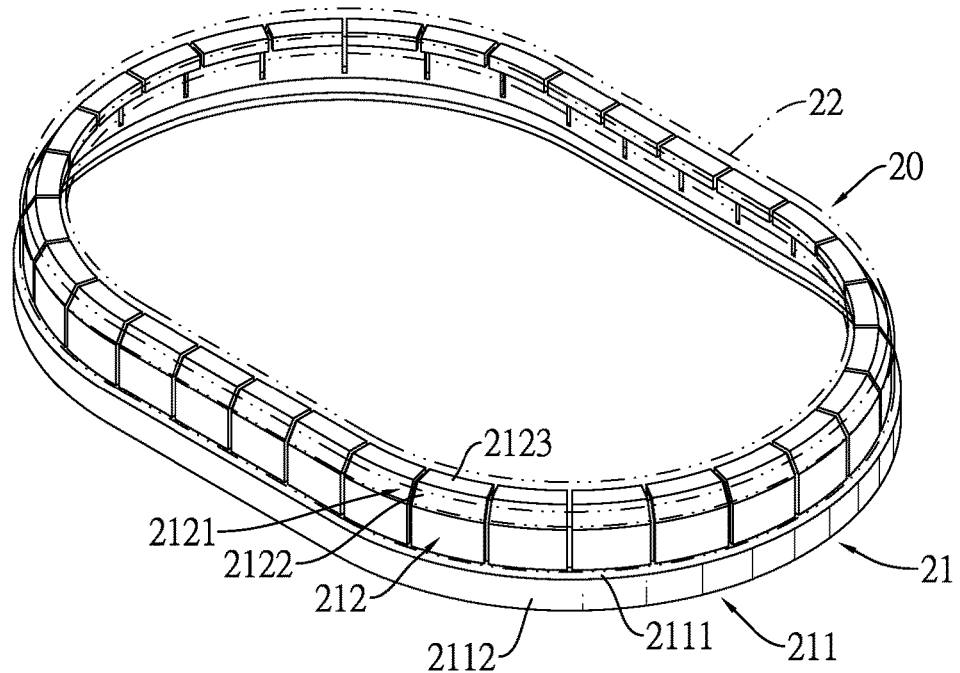
FIG. 3 is an exploded perspective view of a first frame of the filter cartridge in FIG. 1.
Figure 4:
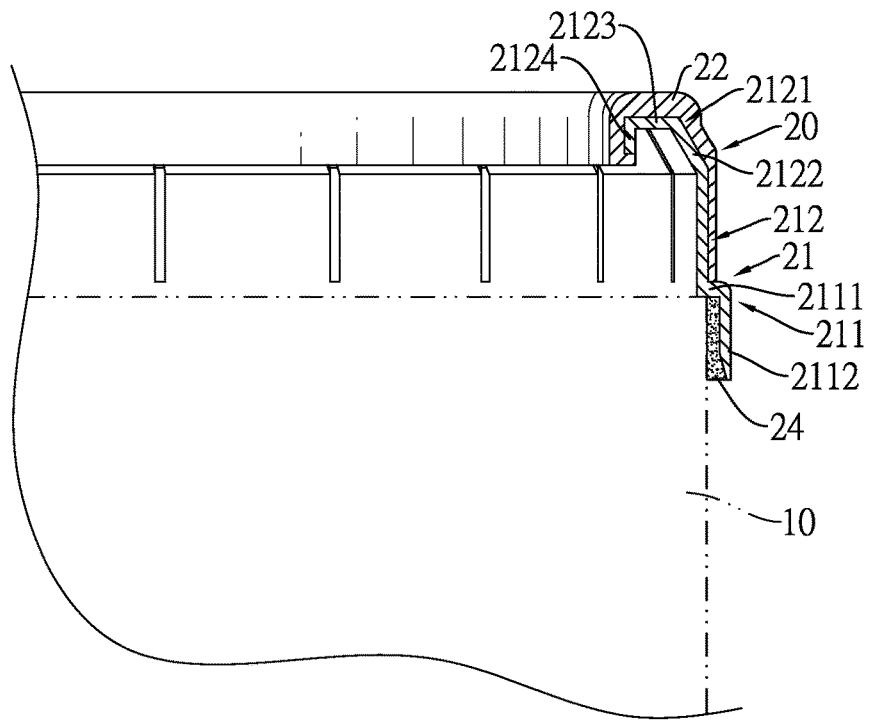
FIG. 4 is a first side view in partial section of the first frame and a resilient element of the filter cartridge in FIG. 1.
Figure 5:
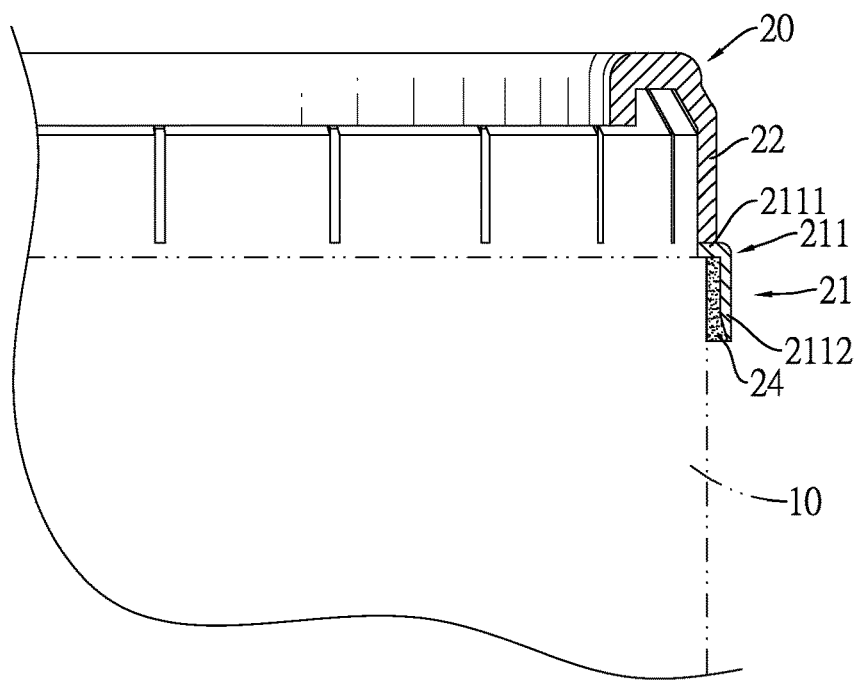
FIG. 5 is a second side view in partial section of the first frame and the resilient element of the filter cartridge in FIG. 1.
Figure 6:
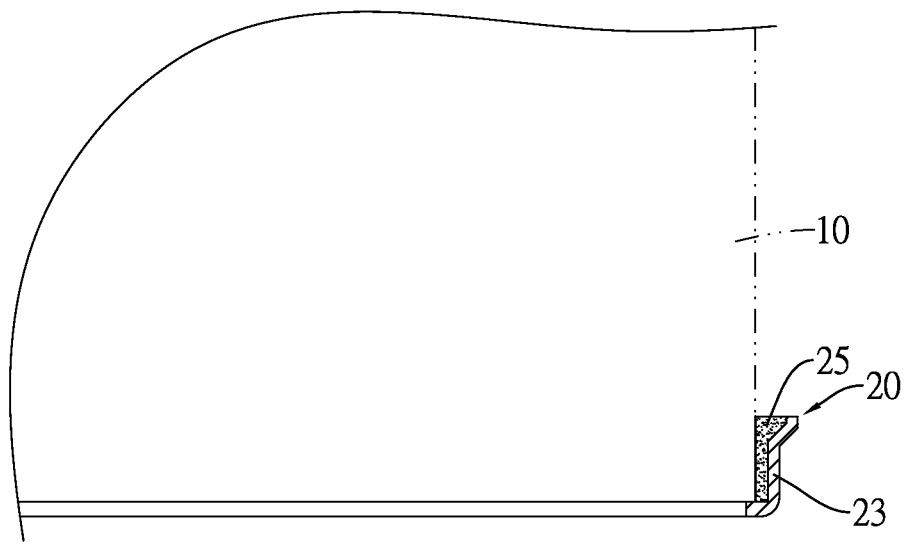
FIG. 6 is a side view in partial section of a second frame of the filter cartridge in FIG. 1.

With reference to FIGS. 2 and 3, the filter frame 20 is mounted on the filter core 10 and has a first frame 21, a first annular adhesive 24, a resilient element 22, a second frame 23 and a second annular adhesive 25. With reference to FIGS. 3 to 5, the first frame 21 has a surrounding segment 211 and multiple connecting sheets 212. The surrounding segment 211 is mounted around an axial surface of the filter core 10, and has a horizontal surrounding segment 2111 and an axial surrounding segment 2112. The horizontal surrounding segment 2111 abuts the axial surface of the filter core 10. The axial surrounding segment 2112 annularly protrudes from an outer periphery of the horizontal surrounding segment 2111 axially toward the filter core 10, and is mounted around the filter core 10. The connecting sheets 212 protrude from an inner periphery of the horizontal surrounding segment 2111 in a direction opposite to the filter core 10, and are annularly arranged apart from each other. Each of the connecting sheets 212 has an extending segment 2121 and a hook segment 2124. The extending segment 2121 is formed on a free end of the connecting sheet 212, bends inward, and has an oblique segment 2122 and a horizontal segment 2123 connected to each other. The oblique segment 2122 is connected to the free end of the connecting sheet 212. The hook segment 2124 is formed on a free end of the horizontal segment 2123, and bends toward the filter core 10. The first annular adhesive 24 is mounted between an outer wall of the filter core 10 and the axial surrounding segment 2112 to securely adhere the filter core 10 and the first frame 21. The resilient element 22 wraps around the extending segment 2121 and the hook segment 2124, and extends to a free end of the hook segment 2124. In a preferred embodiment, the first frame 21 and the resilient element 22 are manufactured by double shot injection molding, and the resilient element 22 is made of rubber. But the manufacturing method of the first frame 21 and the resilient element 22 and the material of the resilient element 22 are by no means limited to the abovementioned. With reference to FIGS. 3 and 6, the second frame 23 is mounted around the other axial surface of the filter core 10. The second annular adhesive 25 is mounted between the outer wall of the filter core 10 and the second frame 23 to securely adhere the filter core 10 and the second frame 23.

Figure 13:
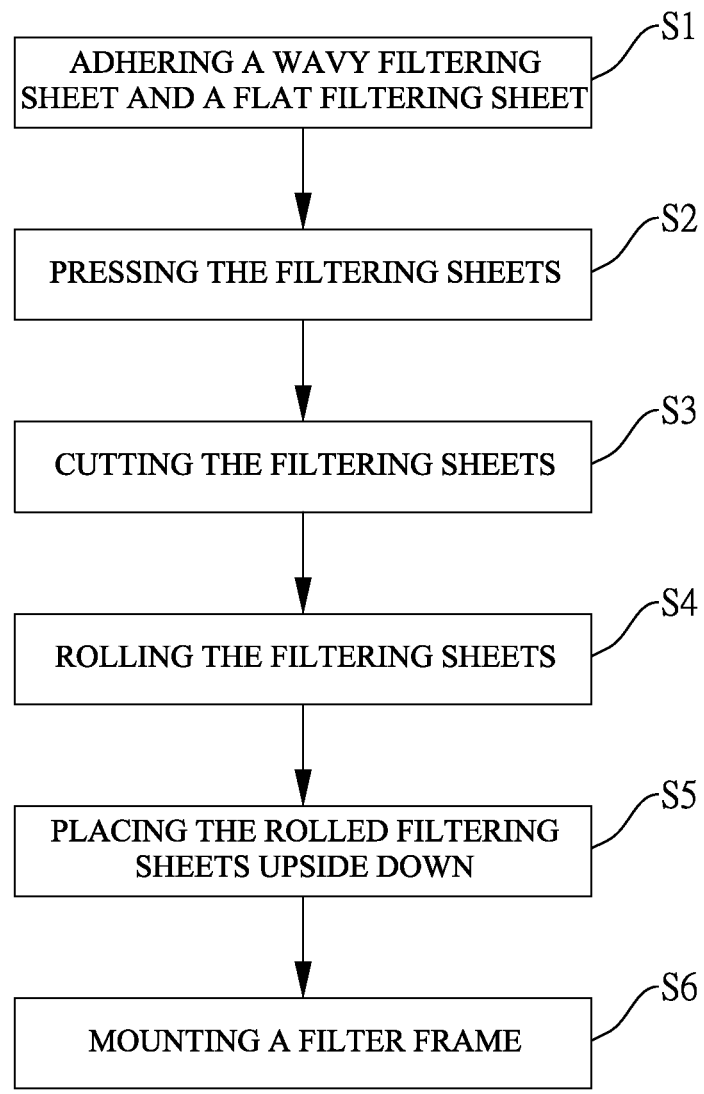
FIG. 13 is a flow chart of a manufacturing method of the filter cartridge in accordance with the present invention.

With reference to FIG. 13, a manufacturing method of the filter cartridge in accordance with the present invention comprises the following steps.

Figure 14:
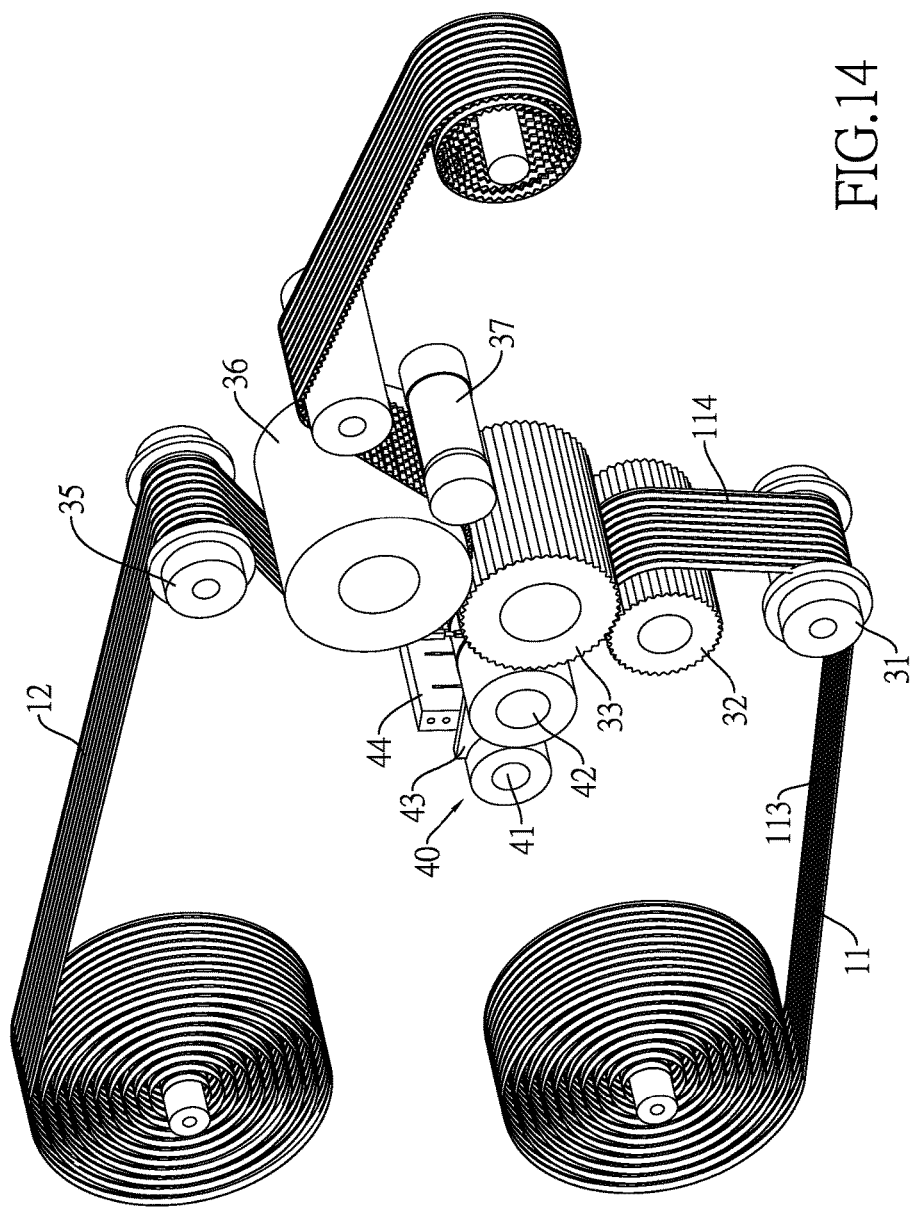
FIG. 14 is a perspective view of apparatus of step (S1) of the manufacturing method of the filter cartridge in FIG. 13.
Figure 15:
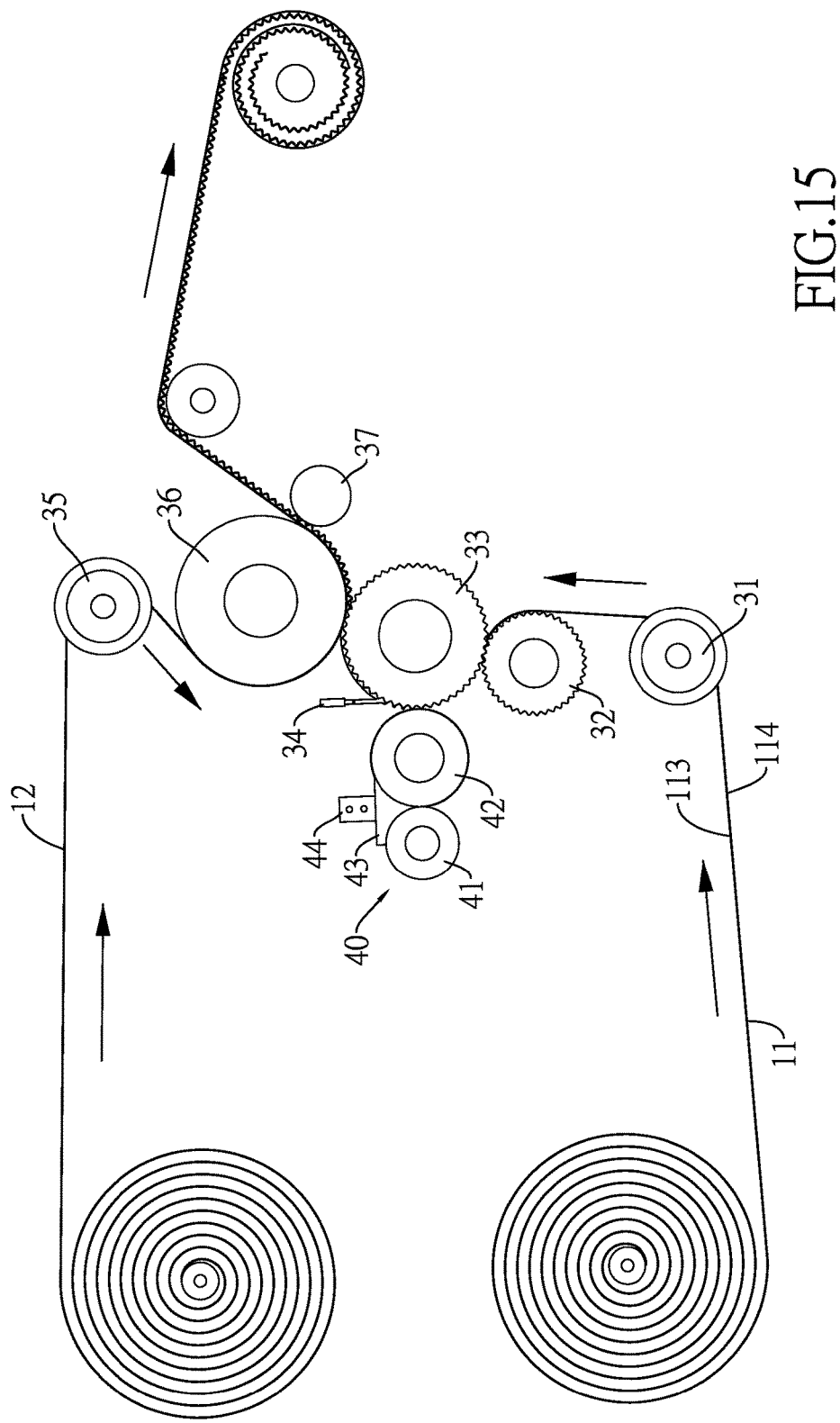
FIG. 15 is a side view of the apparatus of step (S1) of the manufacturing method of the filter cartridge in FIG. 13.

The first step (S1) is to adhere a wavy filtering sheet 11 and a flat filtering sheet 12. With reference to FIGS. 12, 14 and 15, both the wavy and the flat filtering sheets 11, 12 are for filtering suspended pollutants. The wavy filtering sheet 11 has an outlet side 111, an inlet side 112 opposite to the outlet side 111, a first surface 113 and a second surface 114 opposite to the first surface 113. The outlet side 111 and the inlet side 112 are parallel with each other. The wavy filtering sheet 11 in sequence passes a first driving roller 31, passes a lower shaping roller 32 to be pre-heated first, and passes between the lower shaping roller 32 and an upper shaping roller 33 to be formed wavy-shaped and has multiple peaks 115 that extend axially. An extending direction of the peaks 115 is perpendicular to the outlet side 111 and the inlet side 112. Afterwards, the wavy filtering sheet 11 passes a gluing device 40 to coat a connecting adhesive layer 13 on the first surface 113. The peaks 115 extend to the inlet side 112 and the outlet side 111, and the peaks 115 are arranged apart from each other along a spaced-apart direction.

With reference to FIGS. 14 to 17, the gluing device 40 has a stationary roller 41, a rotating roller 42, two stand panels 43, glue 45 and a scraping unit 44. The stationary roller 41 and the rotating roller 42 are parallel with each other, and the rotating roller 42 is rotatably flush with the stationary roller 41. The stand panels 43 are mounted on outer walls of the stationary roller 41 and the rotating roller 42, and are arranged apart from each other. The glue is poured between the outer walls of the rollers 41, 42 and the stand panels 43. A bottom end of the scraping unit 44 is flush with the outer walls of the rollers 41, 42. The scraping unit 44 has multiple elongated holes 441 formed through the front and the rear of the scraping unit 44, and extending into the bottom end of the scraping unit 44. Thus, when the rotating roller 42 rotates, multiple striped glues 451 are attached on the outer wall of the rotating roller 42 from the elongated hole 441. Then, when the wavy filtering sheet 11 passes and the first surface 113 contacts the striped glues 451, the striped glues 451 are attached to the peaks 115 of the first surface 113 to form multiple connecting adhesive dots 131 of the connecting adhesive layer 13. The multiple striped glues 451 make the connecting adhesive dots 131 arranged into multiple separated straight lines. Because the striped glues 451 only contact the peak 115, there is no glue in any trough between any two connecting adhesive dots 131 that are respectively on two adjacent peaks 115.

With reference to FIGS. 15 and 16, then, a gluing gun 34 coats a first end sealing adhesive layer 14 on the first surface 113 along the outlet side 111 and arranged apart from the outlet side 111. Afterwards, the wavy filtering sheet 11 and the flat filtering sheet 12, which pass a second driving roller 35, together pass between the upper shaping roller 33 and a first pressing roller 36 to be tightly pressed. The flat filtering sheet 12 is adhered with the first surface 113 of the wavy filtering sheet 11 by the connecting adhesive layer 13 and the first end sealing adhesive layer 14. The first pressing roller 36 simultaneously cools the adhered filtering sheets 11, 12, and rapidly cools the connecting adhesive layer 13 and the first end sealing adhesive layer 14.

With reference to FIG. 9, in a preferred embodiment, the wavy filtering sheet 11 has multiple corrugations 118 formed on the wavy filtering sheet 11, axially arranged apart from each other, and being perpendicular to the peaks 115 in extending direction. The flat filtering sheet 12 has multiple corrugations 121 formed on the flat filtering sheet 12 and axially arranged apart from each other. The corrugations 118, 121 of the wavy and the flat filtering sheets 11, 12 correspond to each other in amount, shape and position. But the wavy and the flat filtering sheets 11, 12 also can be made of material without corrugation.

The second step (S2) is to press the filtering sheets 11, 12. With reference to FIGS. 10, 14, 15 and 18, the filtering sheets 11, 12 pass between the first pressing roller 36 and a second pressing roller 37. The second pressing roller 37 has a first pressing segment 371 and a second pressing segment 372. The first pressing segment 371 is larger than the second pressing segment 372 in diameter. The pressing segments 371, 372 and the first pressing roller 36 clamp the peaks 115 of the second surface 114 of the wavy filtering sheet 11. The first and the second pressing segments 371, 372 press the peaks 115 of the second surface 114 to respectively form a first pressing region 116 and a second pressing region 117. The first and the second pressing regions 116, 117 respectively extend to the outlet side 111 and the inlet side 112. A border between the first and the second pressing regions 116, 117 lies on the first end sealing adhesive layer 14. The peaks 115 in the first and the second pressing regions 116, 117 lean toward the spaced-apart direction. That is, the peaks 115 in the first and the second pressing regions 116, 117 lean toward the same direction. The peaks 115 in the first pressing region 116 are shorter than the peaks 115 in the second pressing region 117 in height. In addition, the second pressing roller 37 is made of a heat conductive material, in particular, aluminum. At room temperature, the second pressing roller 37 can rapidly cool the wavy filtering sheet 11 via the property of high heat conduction, thereby solidifying the connecting adhesive layer 13 and the first end sealing adhesive layer 14. Moreover, the second pressing roller 37 is moved by a pneumatic or hydraulic cylinder (not shown in the figures). When in use, the pneumatic or hydraulic cylinder moves the second pressing roller 37 toward the first pressing roller 36 to form the first and the second pressing regions 116, 117 on the wavy filtering sheet 11. When not in use, the pneumatic or hydraulic cylinder moves back the second pressing roller 37. Finally, the pressed filtering sheets 11, 12 are rolled into a cylindrical shape.

The third step (S3) is to cut the filtering sheets 11, 12. With reference to FIG. 10, the cylindrical filtering sheets 11, 12 are moved to a cutting device, and then are pulled out and expanded. The filtering sheets 11, 12 are cut along the outlet side 111 and are cut between the outlet side 111 and the first end sealing adhesive layer 14. Afterwards, the cut filtering sheets 11, 12 are rolled into a cylindrical shape again.

The fourth step (S4) is to roll the filtering sheet 11, 12. With reference to FIGS. 7, 8 and 12, the cut and rolled filtering sheets 11, 12 are moved to a rolling device, and then are pulled out and expanded. At this time, the filtering sheets 11, 12 can be rolled around a jig, around a tube, or rolled independently without the jig or tube, depending on the shape after rolling, such as a racetrack or a circle. Ends of the filtering sheets 11, 12 are fixed on the jig or the tube, if the jig or the tube is adopted. Before the filtering sheets 11, 12 are rolled, a glue gun coats a second end sealing adhesive layer 15 on the second surface 114 of the wavy filtering sheet 11 along the inlet side 112. Then the filtering sheets 11, 12 are rolled with the wavy filtering sheet 11 at the inner side. The filtering sheets 11, 12 are adhered with each other and are fixed into a rolled shape by the second end sealing adhesive layer 15. Multiple axial first channels 16 and multiple axial second channels 17 are formed between the rolled filtering sheets 11, 12. The first and the second end sealing adhesive layers 14, 15 are respectively disposed in the first and the second channels 16, 17. The first channels 16 are disposed radially outward relative to the second channels 17.

The fifth step (S5) is placing the rolled filtering sheets 11, 12 upside down. Soon after the filtering sheets 11, 12 are rolled, a jig (not shown in the figures) is mounted around the rolled filtering sheets 11, 12 to fix the shape of the rolled filtering sheets 11, 12. Then, the rolled filtering sheets 11, 12 and the jig are placed at an angle with the inlet side 112 of the wavy filtering sheet 11 disposed on the ground, such that the second end sealing adhesive layer 15 flows downward. In addition, heavy objects or hands are pressed on a top of the rolled filtering sheets 11, 12 when the rolled filtering sheets 11, 12 are placed upside down to ensure the inlet side 112 of the wavy filtering sheet 11 and a corresponding side of the flat filtering sheet 12 are aligned with each other. When the second end sealing adhesive layer 15 is solidified, an axial outer surface of the second end sealing adhesive layer 15 and the inlet side 112 are aligned with each other, and the manufacturing of the filter core 10 is completed.

The sixth step (S6) is to mount a filter frame 20. With reference to FIGS. 1 and 2, the filter frame 20 is mounted on the filter core 10 to form a filter cartridge. The filter frame 20 has a first frame 21, a first annular adhesive 24, a resilient element 22, a second frame 23 and a second annular adhesive 25. The annular adhesives 24, 25 are coated on an outer wall of the filter core 10, and are respectively adjacent to two axial surfaces of the filter core 10. Then, the second frame 23 and the first frame 21 with the resilient element 22 are respectively mounted around the axial surfaces of the filter core 10, and are respectively adhered with the annular adhesives 25, 24. The detail structure of the filter frame 20 has been mentioned above, and thus is not repeated.

With reference to FIG. 10, in a preferred embodiment, an axial width L1 of the first end sealing adhesive layer 14 is between 5 mm and 15 mm, including 5 mm and 15 mm, and particularly is 15 mm. An axial width L2 of the first pressing region 116 is between 5 mm and 10 mm, including 5 mm and 10 mm, and particularly an axial inner side of the first pressing region 116 lies in an axial middle of the first end sealing adhesive layer 14. When cutting the filtering sheets 11, 12, an axial distance L3 between the outlet side 111 and the cutting site is between 2.5 mm and 7.5 mm, including 2.5 mm and 7.5 mm, and particularly the cutting site lies in an axial middle of the first pressing region 116. An original height of the peaks 115 of the wavy filtering sheet 11 is 4 mm, the height H2 of the peaks 115 of the second pressing region 117 is 3 mm, and the height H1 of the peaks 115 of the first pressing region 116 is 2 mm. In another preferred embodiment, the wavy filtering sheet 11 may be implemented without the second pressing region. That is, the remaining area other than the first pressing region 116 is not pressed. At this time, the height H1 of the peaks 115 of the first pressing region 116 is 3 mm. With reference to FIGS. 7 and 8, an angle $\theta_1$ between the leaning peaks 115 in the first pressing region 116 and the flat filtering sheet 12 is between 0 degree and 45 degrees, including 45 degrees, and particularly is 30 degrees. An angle $\theta_2$ between the leaning peaks 115 in the second pressing region 117 and the flat filtering sheet 12 is between 0 degree and 60 degrees, including 60 degrees, and particularly is 45 degrees. But the sizes and angles are by no means limited to the abovementioned, and may be adjusted according to the practical situation.

With reference to FIG. 12, the peaks 115 adjacent to the outlet side 111 are pressed, such that a sectional area of an outlet opening of each second channel 17 is larger than a sectional area of an inlet opening of each first channel 16, thereby reducing the impedance and reducing an aerodynamic force needed when an engine is motivated, which saves the energy.

The end sealing adhesive layers 14, 15 are both pressed and thus can be tightly connected to the filtering sheets 11, 12, thereby making the seal more reliable.

The pressure of the pressing can accelerate the solidifying of the first end sealing adhesive layer 14. The heat conductive second pressing roller 37 also helps the cooling of the first end sealing adhesive layer 14 and the connecting adhesive layer 13 to prevent the first end sealing adhesive layer 14 from flowing axially inward, which may affect the filtering area. As for the second end sealing adhesive layer 15, because the filtering sheets 11, 12 are rolled soon after coating, the tension of the rolling also helps the solidifying of the second end sealing adhesive layer 15. Besides, the filtering sheets 11, 12 are placed upside down soon after rolled, which further makes the second end sealing adhesive layer 15 flow axially outward to avoid affecting the filtering area.

With reference to FIGS. 7 and 8, the peaks 115 in the first pressing region 116 lean toward a same direction, such that there are gaps large enough disposed between any two peaks 115 in arching portions of the innermost circles of the filter core 10 in the outlet side 111. Therefore, the channels are unobstructed. In addition, the second pressing region 117 also reduces the whole height of the wavy filtering sheet 11. Therefore, the filter core 10 can be rolled with the filtering sheets 11, 12 with more circles at the same outer diameter, which further enlarges the filtering area.

With reference to FIG. 10, the first end sealing adhesive layer 14 is arranged apart from the outlet side 111, and the first end sealing adhesive layer 14 is not cut, thereby effectively lowering the obstruction to the cutting.

The cutting also makes the control of the axial length of the filtering sheets 11, 12 more accurate. Besides, heavy objects or hands are pressed on the top of the rolled filtering sheets 11, 12 after the roller filtering sheets 11, 12 are placed upside down, making the axial length of the filter core 10 identical to the pre-rolled axial lengths of the filtering sheets 11, 12.

With reference to FIGS. 11 and 16, the connecting adhesive layer 13 is only coated on the peaks 115, and does not extend into the trough, thereby avoid interfering with the fluid flowing in the first channels 16. Moreover, the connecting adhesive dots 131 are arranged apart from each other on the peaks 115, thus the place without coating the connecting adhesive dots 131 can be used for filtering, which further enlarges the filtering area.

With reference to FIGS. 3 to 5, in the first frame 21 of the filter frame 20, the connecting sheets 212 for mounting the resilient element 22 are annularly arranged apart from each other. Therefore, even if the first frame 21 is made of plastic, the connecting sheets 212 still can be bent to afford enough deformation. Consequently, the resilient element 22 can be made of relatively hard material (relative to foam) such as rubber in order to bear higher differential pressure, and the deformation afforded by the bending connecting sheets 212 can still make the resilient element 22 achieve the seal.

With reference to FIG. 12, when the filter cartridge is in use, the corrugations 118, 121 of the wavy and the flat filtering sheets 11, 12 form concave and convex portions on inner walls of the channels 16, 17, and are axially arranged apart from each other. As a result, when the fluid axially flows in the channels 16, 17, the fluid flows curvedly along the concave and convex portions, and the suspended pollutants on the fluid may hit, gather and accumulate on the corrugations 118, 21, thereby slowing the fluid flow and providing one more filtering process. In addition, the corrugations 118, 121 also enlarge the filtering area.

In another embodiment, the first and the second pressing regions may be formed by other ways rather than using two pressing rollers, as long as the peaks can lean toward a same direction, and the heights of the peaks can be accurately controlled.

In another embodiment, the connecting adhesive layer may be coated by other ways rather than using the gluing device mentioned above, as long as the adhesives can be coated on the peaks and does not extend into the trough. In addition, the connecting adhesive dots may be arranged into various patterns rather than simple straight lines.

In another embodiment, after the filtering sheets are rolled, the rolled filtering sheets may not be placed upside down. That is, the second end sealing adhesive layer is not aligned with the inlet side.

In another embodiment, the filter frame may be implemented without the second frame. The first frame and the resilient element can afford bearing high differential pressure and keeping tightly sealed.

In another embodiment, in the first frame, each connecting sheet may be implemented without the hook segment, or even implemented without the extending segment. The annularly apart arrangement of the connecting sheets also can achieve the same effect.

In another embodiment, the resilient element of the filter frame may be made of material rather than rubber, as long as said material has enough hardness and can be deformed a little to bear high differential pressure.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A manufacturing method of a filter cartridge comprising:
    (a) adhering a wavy filtering sheet and a flat filtering sheet, wherein the wavy filtering sheet is for filtering suspended pollutants and has multiple peaks, an outlet side, an inlet side opposite to the outlet side, a first surface and a second surface opposite to the first surface; the peaks extend to the inlet side and the outlet side, and the peaks are arranged apart from each other along a spaced-apart direction; the first surface is coated with a connecting adhesive layer and a first end sealing adhesive layer; the first end sealing adhesive layer is coated along the outlet side and arranged apart from the outlet side; the flat filtering sheet for filtering suspended pollutants is adhered with the first surface of the wavy filtering sheet by the connecting adhesive layer and the first end sealing adhesive layer;
    (b) pressing the wavy filtering sheet and the flat filtering sheet; pressing the second surface of the wavy filtering sheet along the outlet side of the wavy filtering sheet and from the outlet side to a part of the first end sealing adhesive layer to form a first pressing region to make the peaks in the first pressing region lean toward the spaced-apart direction;
    (c) rolling the wavy filtering sheet and the flat filtering sheet; coating a second end sealing adhesive layer on the second surface of the wavy filtering sheet along the inlet side, then rolling the wavy filtering sheet and the flat filtering sheet and making the wavy filtering sheet and the flat filtering sheet adhere to each other and fixed into a rolled shape by the second end sealing adhesive layer; and
    (d) mounting a filter frame, wherein the filter frame is mounted on the rolled filtering sheets to form a filter cartridge.

2. The manufacturing method as claimed in claim 1, wherein in step (b), on the second surface of the wavy filtering sheet, a remaining area other than the first pressing region is also pressed to form a second pressing region; the peaks in the second pressing region lean toward the spaced-apart direction with the peaks in the first pressing region; and the peaks in the first pressing region are shorter than the peaks in the second pressing region in height.

3. The manufacturing method as claimed in claim 1, wherein in step (b), the wavy filtering sheet and the flat filtering sheet are pressed between two pressing rollers, and at least one of the pressing rollers is made of a heat conductive material.

4. The manufacturing method as claimed in claim 1 further comprising between step (b) and step (c):
    (b1) cutting the wavy filtering sheet and the flat filtering sheet: cutting the wavy filtering sheet and the flat filtering sheet along the outlet side and between the outlet side and the first end sealing adhesive layer.

5. The manufacturing method as claimed in claim 1, wherein in step (a), the connecting adhesive layer has multiple connecting adhesive dots coated on the peaks of the first surface of the wavy filtering sheet and arranged apart from each other.

6. The manufacturing method as claimed in claim 5, wherein in step (a), the connecting adhesive layer is coated by a gluing device, and the gluing device has
    a stationary roller;
    a rotating roller rotatably flush with the stationary roller and parallel with the stationary roller;
    two stand panels mounted on an outer wall of the stationary roller and an outer wall of the rotating roller and arranged apart from each other;

glue poured between the outer wall of the stationary roller, the outer wall of the rotating roller, and the stand panels; and a scraping unit mounted between the outer wall of the stationary roller, the outer wall of the rotating roller, and the stand panels, and scraping to form at least one striped glue disposed on the outer wall of the rotating roller, and attached to the peaks on the first surface of the wavy filtering sheet to form the connecting adhesive layer.

7. The manufacturing method as claimed in claim 1, wherein in step (d), the filter frame has a first frame having a surrounding segment mounted around the wavy filtering sheet and the flat filtering sheet;

multiple connecting sheets protruding from the surrounding segment in a direction opposite to the wavy filtering sheet and the flat filtering sheet, and the connecting sheets annularly arranged apart from each other; and a resilient element formed on the connecting sheets.

8. The manufacturing method as claimed in claim 7, wherein in step (d), each of the connecting sheets of the first frame has an extending segment formed on a free end of the connecting sheet and bending inwardly; and a hook segment formed on a free end of the extending segment and bending toward the wavy filtering sheet and the flat filtering sheet; and the resilient element wraps around the extending segment and the hook segment.

9. The manufacturing method as claimed in claim 1, wherein in step (a), the wavy filtering sheet has multiple corrugations formed on the wavy filtering sheet, axially arranged apart from each other, and being perpendicular to the peaks in an extending direction;

the flat filtering sheet has multiple corrugations formed on the flat filtering sheet and axially arranged apart from each other; and the corrugations of the wavy filtering sheet and the corrugations of the flat filtering sheet correspond to each other in amount, shape and position.

\* \* \* \* \*